United States Patent [19]

Meier et al.

[11] Patent Number: 5,450,088
[45] Date of Patent: Sep. 12, 1995

[54] TRANSPONDER ARRANGEMENT

[75] Inventors: Herbert Meier, Moosburg; Martin Sellmeir, Neufinsing, both of Germany

[73] Assignee: Texas Instruments Deutschland GmbH, Germany

[21] Appl. No.: 981,635

[22] Filed: Nov. 25, 1992

[51] Int. Cl.$^6$ .................................... G01S 13/76
[52] U.S. Cl. ................................. 342/51; 342/42; 342/44
[58] Field of Search .......................... 342/51, 44, 42

[56] References Cited

U.S. PATENT DOCUMENTS

| | | | |
|---|---|---|---|
| 4,588,880 | 5/1986 | Hesser | 235/376 |
| 4,912,471 | 3/1990 | Tyburski et al. | 342/42 |
| 5,053,774 | 10/1991 | Schuermann et al. | 342/44 |
| 5,144,314 | 9/1992 | Malmberg et al. | 342/44 |
| 5,287,112 | 2/1994 | Schuermann | 342/42 |
| 5,347,280 | 9/1994 | Schuermann | 342/42 |

FOREIGN PATENT DOCUMENTS

| | | |
|---|---|---|
| 0242906 | 4/1987 | European Pat. Off. . |
| 0347893 | 6/1989 | European Pat. Off. . |
| 0404148 | 6/1989 | European Pat. Off. . |
| 0438250A1 | 1/1991 | European Pat. Off. . |
| WO-A-9119997 | 12/1991 | WIPO . |

Primary Examiner—John B. Sotomayor
Attorney, Agent, or Firm—Brian C. McCormack; James C. Kesterson; Richard L. Donaldson

[57] ABSTRACT

A transponder arrangement is described having an interrogator unit (10) which transmits at least one RF programming sequence and at least one RF interrogation pulse. The responder unit (12) includes a responder unit receiver (130) for receiving data transmitted by the RF programming sequence from the interrogator unit (10). The responder unit (12) then upon receipt of the RF interrogation pulse transmits data, which may have been modified by the programming sequence from the interrogator unit (10), back to the interrogator unit (10) in the form of a modulated RF carrier. The responder unit (12) further comprises a responder unit energy accumulator (136) which stores energy contained in the RF interrogation pulse and a responder unit end of burst detector (142) which upon detection of a decreasing power level of the RF interrogation pulse sends a RF threshold signal. Further contained within the responder unit (12) is a responder unit RF carrier wave generator (130) operating with the frequency contained in the RF interrogation pulse, which is excited upon receipt of a signal from the pluck circuit (196). The responder unit (12) further comprises a responder unit circuitry means (198,200) for providing from the output signal of the RF carrier wave generator a control signal which is utilized to maintain the RF carrier wave and to modulate the RF carrier to be sent back with the stored data.

21 Claims, 5 Drawing Sheets

TRANSPONDER ARRANGEMENT

CROSS-REFERENCE TO RELATED PATENTS

The following coassigned patent is hereby incorporated herein by reference:

| Pat No. | Filing Date | TI Case No. |
| --- | --- | --- |
| 5,053,774 | 2/13/91 | TI-12797A |

FIELD OF THE INVENTION

This invention generally relates to a transponder arrangement comprising an interrogation unit which transmits at least one RF interrogation pulse to a responder unit which thereupon sends data stored therein back to the interrogation unit in the form of a modulated RF carrier. The interrogation unit of the present invention is further operable to transmit data to the responder unit which thereupon may initiate actions dependent upon the data so received.

BACKGROUND OF THE INVENTION

There is a great need for devices or apparatuses which make it possible to identify or detect as regards their presence at a predetermined location objects which are provided with such devices or apparatuses in contactless manner and over a certain distance. An additional need exists to be able to change the data stored in, or operating characteristics of, such devices or apparatuses (i.e. "program" the devices or apparatuses).

It is, for example, desirable to request contactless and over a certain distance identifications which are uniquely assigned to an object and which are stored in the device or apparatus so that, for example, the object may be identified. A determination may also be made as to whether or not a particular object exists within a given reading range. An example is also the case in which physical parameters such as the temperature or the pressure are to be interrogated directly at or within the object, without direct access to the object being possible. A device or apparatus of the type desired can, for example, be attached to an animal which can then always be identified at an interrogation point without direct contact. There is also a need for a device which when carried by a person permits access checking whereby only persons whose responder unit returns certain identification data to the interrogation unit are allowed access to a specific area. In this case the safeguarding of the data transfer is a very essential factor in the production of such devices. A further example of a case in which such a device is needed is the computer controlled industrial production in which, without the intervention of operating personnel, components are taken from a store, transported to a production location and there assembled to give a finished product. In this case a device is required which can be attached to the individual components so that the components can be specifically detected in the spares store and taken therefrom.

It is desirable within the context of this field to be able to update characteristics of the responder unit in a contactless manner subsequent to its manufacture. For example, it is desirable to provide means for changing the tuned frequency of a responder unit in order to optimize system performance. Perhaps it would be desirable to manufacture all responder units in a common fashion and customize the units by changing the operating frequency or another parameter. The inventive concept might be used in any of the above cases, or others, to update characteristics of the responder unit.

Another example is to implement a means to test a responder unit in a contactless fashion such that an interrogator unit might send a test command to the responder unit and receive test results back from the responder unit. Still further applications would include the sending of commands to, and receipt of parameters from, a responder unit's command decoder which may be operating a sensor or a plurality of sensors. Yet another application might be to transmit to the responder unit, again in a contactless fashion, a responder address to be stored in the responder's nonvolatile memory. In such an application, the responder might monitor incoming RF interrogation signals and only respond to further inquiries subsequent to receipt of its corresponding address signals.

SUMMARY OF THE INVENTION

It is desirable within the context of this field to be able to update characteristics of the responder unit in a contactless manner subsequent to its manufacture. For example, it is desirable to provide means for changing the tuned frequency of a responder unit in order to optimize system performance. Perhaps it would be desirable to manufacture all responder units in a common fashion and customize the units by changing the operating frequency or another parameter. The inventive concept might be used in any of the above cases, or others, to update characteristics of the responder unit.

Another example is to implement a means to test a responder unit in a contactless fashion such that an interrogator unit might send a test command to the responder unit and receive test results back from the responder unit. Still further applications would include the sending of commands to, and receipt of parameters from, a responder unit's command decoder which may be operating a sensor or a plurality of sensors. Yet another application might be to transmit to the responder unit, again in a contactless fashion, a responder address to be stored in the responder's nonvolatile memory. In such an application, the responder might monitor incoming RF interrogation signals and only respond to further inquiries subsequent to receipt of its corresponding address signals.

The needs outlined hereinabove can be met with the inventive concept disclosed herein. For universal usability of such an arrangement the interrogation or enquiry unit is preferably handy and compact so that it withstands rough treatment in practice. The responder is preferably very small so that it can readily be attached to, or inserted in, the objects to be detected.

The invention is based on the problem of providing a transponder arrangement with the aid of which the aforementioned requirements can be fulfilled and with which the necessary responder device can be made very economically and very small so that it can be used for a great variety of purposes, in particular whenever many objects are to be provided with the responder unit. The responder unit is to be constructed so that it has a very low energy requirement and does not need its own power source which after a certain time would have to be renewed.

This problem is solved in the transponder arrangement, according to the invention, by providing an energy accumulator within the responder unit by which the energy contained in the RF interrogation pulse is stored. The responder unit provides means to detect the termination of the reception of the RF interrogation pulse and the presence of a predetermined energy amount in the energy accumulator, thereupon triggering the excitation of a RF carrier wave generator operating with the frequency contained in the RF interrogation pulse. Further means are provided to produce a control signal which is utilized to maintain the RF carrier wave and to modulate the RF carrier to be sent back to the interrogator with the stored data. Still further means are provided to demodulate, from the RF carrier wave, data which may be stored in the responder unit memory.

The transponder arrangement according to the invention includes a responder unit which with high efficiency, i.e. high peak power and high data transfer rate, permits the return of the data stored therein to the interrogation device and the reception of commands and data from the interrogation device. According to a preferred embodiment of the invention, the transmission reliability can be increased by transmitting the information several times in succession. The transfer time can be kept so short that interferences to the transfer from outside are not very probable. Because of the high transfer rate it is also possible to arrange the responder unit on very rapidly moving objects without any interference occurring due to the Doppler effect.

BRIEF DESCRIPTION OF THE DRAWINGS

In the drawings.

Corresponding numerals and symbols in the different figures refer to corresponding parts unless otherwise indicated.

DETAILED DESCRIPTION OF PREFERRED EMBODIMENTS

Figure 1:
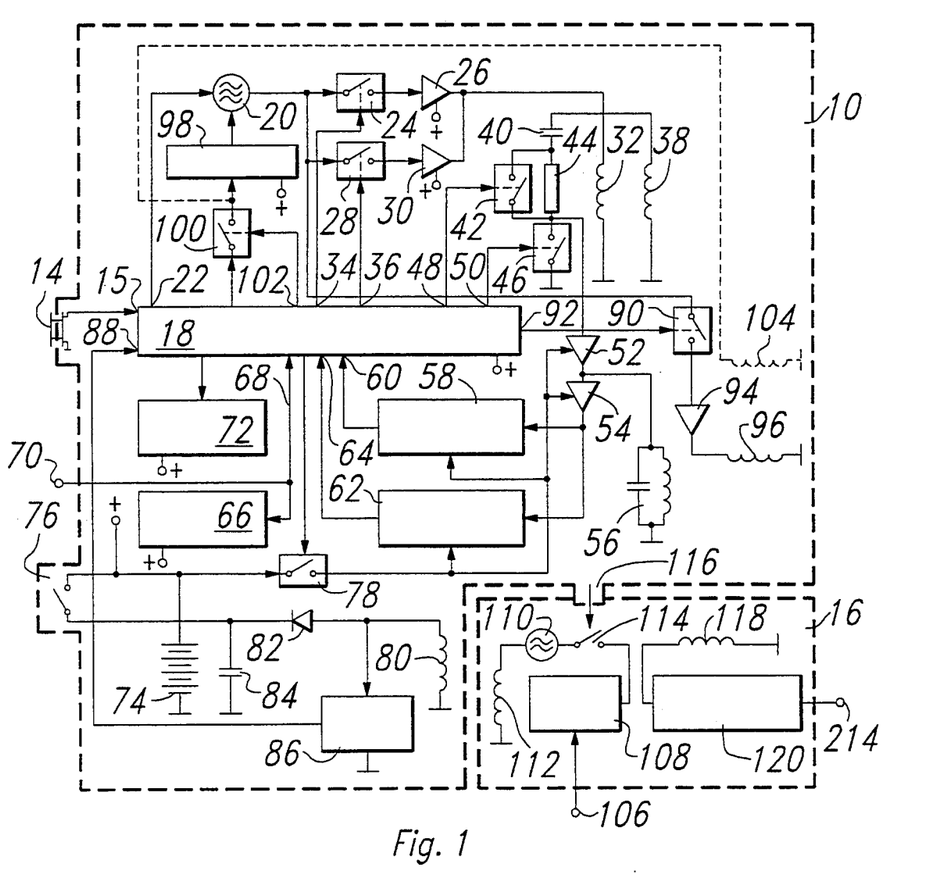
FIG. 1 is a block circuit diagram of the interrogation unit of the transponder arrangement according to the invention and of a base unit cooperating with said interrogation unit.

The transponder arrangement to be described includes an interrogation unit 10 and a responder unit 12. The interrogation unit 10 is preferably constructed to be held in the hand of an operator and to transmit a RF interrogation pulse on actuation of a key 14. This interrogation unit 10 also has the capacity of receiving RF signals and detecting information contained in said signals. The RF signals come from the responder unit 12 which according to this embodiment replies to the transmission of a RF interrogation pulse by sending back the RF signal having preferably the same frequency as the interrogation pulse. Preferably the RF signal is modulated with data by the responder unit 12 using frequency shift keying (FSK) modulation. Associated with the interrogation unit 10 is a base unit 16 which is constructed as a stationary unit. The functions of the interrogation unit 10, the responder unit 12 and base unit 16 and their interaction will be described in more detail hereinafter. Firstly, the makeup of these units will be explained.

The interrogation unit 10 contains as central control unit a microprocessor 18 which is responsible for the control of the function sequences. A RF oscillator 20 generates RF oscillations as soon as it has been set in operation by a signal at the output 22 of the microprocessor 18. The output signal of the RF oscillator 20 can be supplied either via a switch 24 and an amplifier 26 or via a switch 28 and an amplifier 30 to a coupling coil 32. The switches 24 and 28 are controlled by the microprocessor with the aid of signals emitted at its outputs 34 and 36 respectively. Coupled to the coupling coil 32 is a coil 38 of a resonant circuit which consists of the coil 38 and the capacitor 40. In series with the coil 38 and the capacitor 40 is a resistor 44 bridgeable by a switch 42 and a further switch 46 lies between the resistor 44 and ground. The switches 42 and 46 are controlled by the microprocessor which emits at its outputs 48 and 50 corresponding control signals. When the switch 46 is closed the resonant circuit comprising the coil 38 and capacitor 40 acts as parallel resonant circuit whilst when the switch 46 is open it acts as series resonant circuit. The coil 38 acts as transmitting and receiving coil which transmits the RF interrogation pulse supplied to it by the oscillator 20 and receives the RF signal sent back by the responder unit 12.

The RF signals received by the resonant circuit are supplied to two amplifiers 52, 54 which are so designed that they amplify the RF signals received and limit them for pulse shaping. Connected to the amplifiers is a parallel resonant circuit 56 which ensures the necessary reception selectivity. The output of the amplifier 54 is connected to a clock generator 58 which from the signal supplied thereto generates a clock signal and supplies the latter to the input 60 of the microprocessor 18.

In addition, the output signal of the amplifier 54 is supplied to a demodulator 62 which demodulates the signal applied thereto and supplies it to the input 64 of the microprocessor 18.

The information contained in the RF signal received is supplied after the demodulation in the demodulator 62 via the microprocessor 18 to a random access memory 66 so that it can be stored in the latter. Between the microprocessor 18 and the random access memory 66, a bi-directional connection 68 is disposed which makes it possible to enter information from the microprocessor 18 into the random access memory 66 and also to transfer information in the opposite direction. The information stored in the random access memory 66 can be taken off at a jack 70.

A display unit 72 fed by the microprocessor 18 makes it possible for the operator to view the data contained in the RF signal received.

Since the interrogation unit 10 is a portable device, a rechargeable battery 74 is provided as a power supply. The output voltage of the battery 74 is supplied after closing a switch 76 to the terminals designated by "+" of selected chips in the interrogation unit 10. The supply voltage is however supplied to the two amplifiers 52, 54, the clock generator 58 and the demodulator 62 via a separate switch 78 which is controlled by the microprocessor 18. This makes it possible for those circuit elements to be supplied with voltage and thus active only during a predetermined period of time within the total operating cycle.

The battery 74 can be charged by a voltage induced in a coil 80, rectified in a rectifier 82 and smoothed by means of a capacitor 84. Preferably, the voltage is induced in coil 80 via a coil 112 in the base unit 16. A charge sensor 86 detects when a charge voltage is induced in the coil 80, i.e. a charging operation of the battery 74 is taking place. It then emits to the input 88 of the microprocessor 18 a corresponding message signal.

A further switch 90, controlled by means of a signal from the output 92 of the microprocessor 18, can in the closed state supply the output signals of the RF oscillator 20 via an amplifier 94 to a coupling coil 96. The switch 90 is typically used to activate the sending of a RF interrogation pulse to a responder unit 12 to initiate a data transfer to or from the responder unit 12.

With the aid of a modulator 98 the RF oscillator 20 can be modulated. The modulation signal necessary for this purpose is supplied to the modulator 98 by the microprocessor 18 via a switch 100 which is controlled by means of a signal from the output 102 of the microprocessor. The modulation signal from the microprocessor 18 is supplied when the switch 100 is closed also to a coupling coil 104.

The base unit 16 also illustrated in FIG. I is a stationary unit which is connected via a jack 106 to the mains supply network. In a power supply 108 the operating voltage for a charging voltage generator 110 is generated, the output signal of which is supplied to a coil 112. A switch 114 is inserted between the power supply 108 and the charge voltage generator 110. The switch 114 is closed whenever the interrogation unit 10 is placed on the base unit 16. This is shown in FIG. I symbolically by a sort of actuating button 116 at the boundary line of the interrogation unit 10. The coils 112 and 80 are arranged in the base unit and interrogation unit 10 spatially in such a manner that they cooperate like the primary winding and secondary winding of a transformer when the interrogation unit 10 is placed on the base unit 16. In this manner the battery 74 can be charged contactless as often as required. The coils 96 and 104 in the interrogation unit 10 are so arranged that they are spatially very close to a coil 118 when the interrogation unit 10 is placed on the base unit 16. In this manner a contactless signal transmission between the coil 96 and the coil 104 on the one hand and the coil 118 on the other is possible. A demodulator 120 serves to demodulate the signals coming from the coil 118.

Figure 2A:
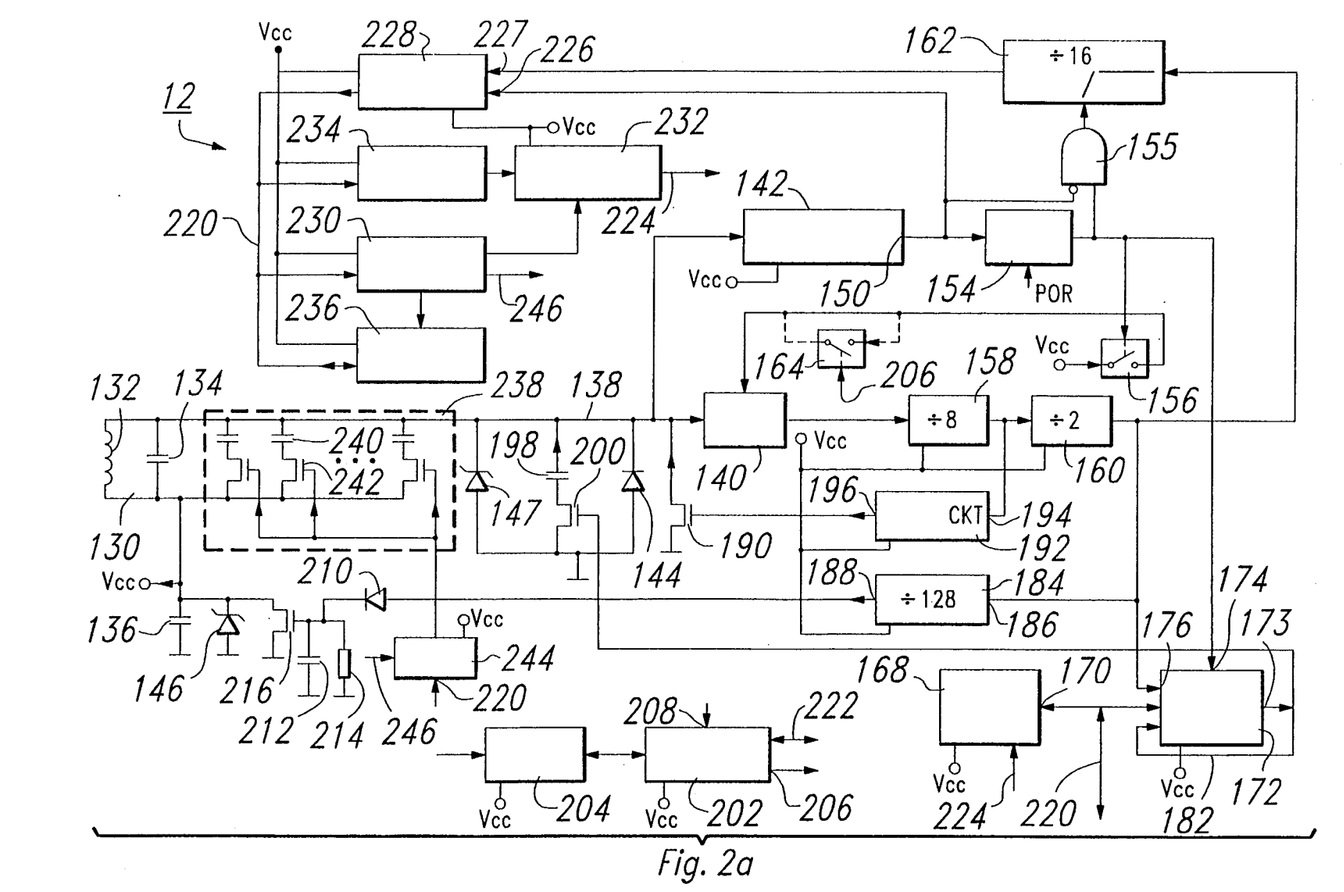
FIGS. 2a-2b are block circuit diagrams of the responder unit of the transponder arrangement according to the invention.

The first preferred embodiment responder unit 12 illustrated in FIGS. 2a contains for reception of the RF interrogation pulse a parallel resonant circuit 130 having a coil 132 and a capacitor 134. Connected to the parallel resonant circuit 130 is a capacitor 136 serving as energy accumulator. In addition the parallel resonant circuit 130 is connected to a RF bus 138. The resonant circuit 130 acts as a receiver and as a transmitter as is well known in the art. A clock regenerator circuit receives the RF signal from the RF bus 138 and regenerates a clock signal 139 having a substantially square waveform. An end of burst detector 142 connected to the RF bus 138 has the function of monitoring the power level of a RF carrier at the RF bus 138. Such a RF carrier occurs at the RF bus 138 whenever the parallel resonant circuit 130 receives a RF interrogation pulse from the interrogation unit 10. The end of burst detector 142 emits at its output a RF threshold signal of predetermined value as soon as the power level of the RF carrier at the RF bus 138 drops below a predetermined threshold value. By connecting a diode 144 to the RF bus 138, the RF carrier is rectified and as a result the capacitor 136 is charged. The energy stored in capacitor 136 is proportional to the energy contained in the RF interrogation pulse. Thus, after reception of the RF interrogation pulse a DC voltage can be taken off at the capacitor 136. A zener diode function 146 connected to the capacitor 136 ensures that the DC voltage which can be tapped off does not exceed a value defined by the zener voltage of the diode 146 in practical implementations such as within an integrated circuit, the zener diode function 146 might be accomplished by a number of circuits well known in the art for limiting voltage. A zener diode function 146 serves a similar function to prevent the voltage on the RF bus 138 from becoming too great. Initially upon interrogation of the responder unit 12 the interrogator unit 10 sends a RF signal to the responder unit for the express purpose of charging the responder unit 12. This is referred to as the charge phase.

A Power-On-Reset (POR, not shown) circuit provides a POR signal to a start detect circuit 154. This POR circuit monitors the Vcc level and is activated when the Vcc level rises from a level below a certain DC threshold to a level above a certain DC threshold. Typically, the POR signal occurs within the charge phase of the responder unit. POR circuits are well known in the art, indeed they are commonly used in almost all of the class of circuits known as "state machines" so that the circuits may be initialized to a known state. The start detect circuit 154 upon receiving the POR signal will then monitor the output 150 of end of burst detection circuit 142. At output 150 is provided an end of burst signal (EOB). Upon receipt of an affirmatively stated EOB subsequent to the affirmatively stated Power-On-Reset signal, start detect circuit 154 switches power to the clock regenerator circuit 140 via switch 156. Clock regenerator circuit 140 preferably will clean up the signal from resonant circuit 130 and provide a regenerated RF clock which is preferably a square wave. Output of start detect circuit 154 will remain positively asserted until a subsequent POR is received. All parts of the transponder other than the clock regenerator 140 are continuously supplied with Vcc, but preferably consume a negligible amount of power in their inactive states (i.e. when the clock regenerator 140 is inactive) due to the utilization of low power CMOS technology.

With further reference to FIG. 2a, a divider 158 receives clock signal 139 and divides its frequency, preferably by a factor of eight. A pluck circuit 192 preferably sends a momentary pulse each time it is so triggered by the divided clock signal as received from divider 158. This pluck circuit 192 maintains the oscillation of resonant circuit 130 by momentarily rendering field-effect transistor or FET 190 conductive and forming therethrough a conductive path between the resonant circuit 130 and ground via RF bus 138 such that the resonant circuit gains electrical energy from storage capacitor 136. This pluck circuit 192 is figuratively named to describe the maintaining of the oscillation of resonant circuit 130 much like the plucking of a guitar string maintains the oscillation of the guitar string. While this "plucking" action will momentarily lower the voltage on RF bus 138 the duration of the pulse is not sufficient given the channel resistance of FET 190 to lower the voltage below the threshold to trigger the end of burst detection circuit 142 to activate. A second divider 160 divides the clock signal 139 again by a factor of two such that the clock frequency at the output of divider 160 is 1/16 the original clock frequency.

Still referring to FIG. 2a, the read circuitry for the preferred embodiment will now be described. Connected to the output of second divider 160 is the shift clock input 176 of an output shift register 172 such that data is shifted through this register 172 at 1/16 the original clock frequency. Output shift register 172 receives a parallel load from memory 168 or another source via data bus 220 upon receipt at its shift/load_ input 174 of a "load_" signal from the output of start detect circuit 154. Subsequent to loading of the output shift register 172 the signal from start detect circuit 154 is asserted positively and hence a "shift" signal is received at the shift/load_ input 174 of register 172. While the "shift" signal is positively asserted data will be shifted through output shift register at 1/16 the original clock frequency due to the clock signal received at the shift clock input 176. As shown in the figure, the data recirculates through the output shift register 172 via the data path 182 and also feeds the gate of FET or modulator 200 via data path 182. The output shift register data are preferably low for a certain time (Pre-Bit-Time) and high or low dependent upon the data loaded therein. The Pre-Bit-Time is used in this embodiment to allow the interrogator receiver coil 38 time to recover from power burst overload (Charge Phase) and it is used to discriminate the read function from the write function as will be described below. While the output of output shift register 172 is low then the FET 200 is not conducting. While the output of output shift register 172 is high FET 200 conducts, thereby connecting capacitor 198 to the resonant circuit 130 and lowering the resonant frequency thereof. Essentially, the FET 200 acts as a switch under control of output shift register 172, connecting or leaving unconnected capacitor 198 which modulates the frequency of the resonant circuit 130. In this manner a frequency modulation of the resonant or carrier frequency of resonant circuit 130 is accomplished in response to the data applied to FET 200. A low or "zero" signal is represented when the original resonant frequency of the resonant circuit 130 is maintained throughout a bit period. A high or "one" signal is represented when the new resonant frequency of the parallel combination of original resonant circuit 130 in parallel with capacitor 198 occurs within a bit period.

With still further reference to FIG. 2a, the operation of a discharge logic circuit will now be described. A third divider 184 receives at its input 186 the output of divider 160 and divides the clock signal by yet another factor of 128. The division factor of third divider 184 is 128 in this instance due to the preferred data transmission bit length of 128. If this bit length were to change, then the division factor of third divider 184 would preferably change correspondingly. A diode 210 maintains unidirectional current flow from the divider 184 into a parallel RC combination of a capacitor 212 and a resistor 214 which maintain charge on the gate of a field-effect transistor or FET 216 for a known duration. With the diode 210 the capacitor 212 may be charged by divider 184, but must be discharged through resistor 214. The FET 216 serves to provide, when the gate of FET 216 maintained above a threshold voltage by the parallel combination of resistor 214 and capacitor 216, a low impedance discharge path for storage capacitor 1336 to ground. In this manner, after transmission of a complete data frame in this case of 128 bits (read phase) from the transponder 12 to the interrogator unit 10, the remaining energy in the transponder 12 is eliminated by a short circuit across the charge capacitor 1336. This action secures that the transponder is correctly initiated during the next charge phase and does not rest in a undefined or incorrect state such that a subsequent charge-up could be blocked. Additionally by this function, each transponder 12 within the field of the interrogator 10 has an identical start condition.

Figure 4:
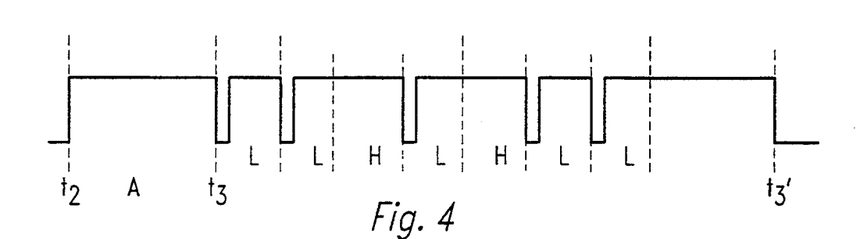
FIG. 4 is a timing diagram to explain a modulation scheme used for programming the responder unit memory in relation to the overall timing scheme as shown in FIG. 3.

Still referring to the circuitry of responder unit 12 as shown in FIG. 2a, the circuitry with which data may be written into responder unit 12 (the write function) will now be described. In a preferred embodiment of the invention the interrogator unit 10 may pulse pause modulate (PPM) the RF interrogation pulse as shown in FIG. 4. This signal is reflected on RF bus 138. As is well known in the art, a pulse pause modulation system operates by alternatively activating and deactivating a carrier wave. During the time period in which the carrier is deactivated, the end of burst detector 142 senses a decrease in RF energy and is activated. After the start detect circuit 154 is enabled by the POR signal, the start detect circuit 154 is then activated by the first EOB signal caused by the Start Bit (see FIG. 4). Although a Start Bit is used in this preferred embodiment due to the fact that each data bit status is transmitted by the presence or absence of a carrier wave off phase as will be further described. Other embodiments are possible, however, in which no Start Bit needs to be transmitted. The duration of the time period in which the carrier is deactivated, known as the "off" phase, is shorter than the Pre-Bit-Time of the read phase. This particular requirement is used within this embodiment due to the fact that during the off phase, the output shift register 172 will start to shift. But since the Pre-Bit-Time is greater than the off phase the output shift register is unsuccessful in shifting anything but zeros out, so in fact FET 198 is never activated and inverted and no unwanted modulation of the carrier 138 will occur. The EOB signal is then deactivated when the carrier returns. The activations and deactivations of the EOB signal serve to provide a data stream to the data input 226 input of input shift register 228. Regardless of the transitions of EOB start detect circuit 154 maintains its output active until a new POR signal is received, thus maintaining power to clock regenerator circuit 140 via switch 156.

A fourth divider 162 is provided receive the clock signal from second divider 160 and the divide clock signal again by 16 in order to supply the clock input 227 of the input shift register 228 with an Input Clock signal. In the preferred embodiment, then, the write data rate is 1/256 of the resonant frequency or receive clock frequency. Provision must be made that the data is shifted into the input shift register 228 while the data is stable. This can be assured in the following manner. The fourth divider 162 is activated by the start detect circuit 154 via AND gate 155. Each consecutive "zero" bit or "low" bit received by end of burst detection circuit 142 positively asserts the output 150 of the burst detection circuit. The positively asserted signal is then received the negative logic input of AND gate 155. The negative logic input is indicated by a "bubble" at the input of AND gate 155 as is well known in the art. By definition of the AND function the output of AND gate 155 will then be negatively asserted, thereby clearing the fourth divider 162 and synchronizing the Input Clock to the Input Data.

End detection circuit 234 detects the end of a data frame if a certain bit combination is in the input shift register 228 and thereupon activates the programming logic 232 if a programming command has been previously received by command decoder 230. The data is then transferred from input shift register 228 to memory 168 or another memory via parallel data bus 220. Preferably, the memory the to which the data is transferred is an electrically-erasable programmable read only memory (EEPROM).

End of burst detector 142 is generally acting in the capacity of a pulse pause modulation (PPM) demodulator. Many other modulations schemes are known in the art for radio communication and instead of the end of burst detector, another demodulator might be used for another of such schemes.

Provision is also made in this preferred embodiment to initiate a test sequence via test logic 236. Test logic 236 receives signals from command decoder 230 and data from data bus 220 and may initiate numerous test routines such as are commonly implemented in the field of logic circuit design. The results of these test routines may be placed on data bus 220 and output by shift register 172 to the modulation circuitry via field-effect transistor 200.

A programmable tuning network 238 is provided in the preferred embodiment of the present invention. This programmable tuning network 238 operates by switching a network of parallel capacitors 240, each capacitor 240 being connected through a field-effect transistor or FET 242 to ground. Each field-effect transistor is connected to a latch 244 which receives and latches data from the memory 168 or from command decoder 230 via data bus 220 under control of a latch signal 246 from the command decoder 230. By switching a field-effect transistor 242 to a conducting "ON" state, its associated capacitor 240 is connected in parallel with parallel resonant circuit 130. This added capacitance will lower the resonant frequency of the parallel resonant circuit 130. By switching a field-effect transistor 242 to a non-conducting "OFF" state, its associated capacitor 240 is floating and has no effect on the parallel resonant circuit 130. A network 238 of FET/capacitor pairs 240,242 can provide many different values of added capacitances depending on the combinations of each capacitor's 240 relative value as is well known in the art. Alternatively, latch 244 could be a one-time-programmable (OTP) memory such that the data is fixedly stored therein and the device may be permanently programmed to set the value of programmable tuning network 238.

The factors of the dividers disclosed in the embodiments listed herein are chosen to fit the particulars of each design. The division factors should be computed in each case to most optimally perform the task for which they were designed.

Figure 2B:
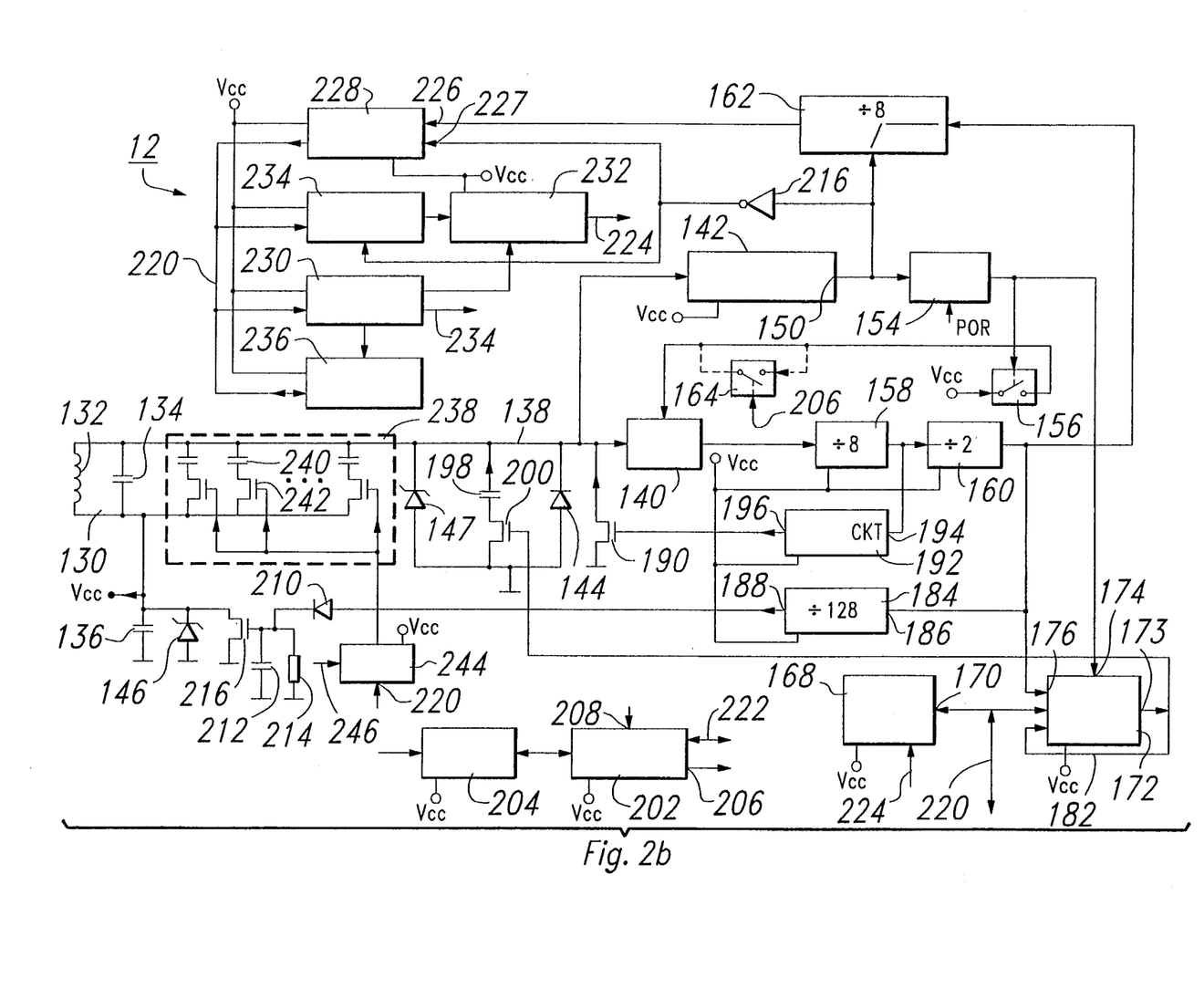

The second preferred embodiment responder unit 12a shown in FIG. 2b is substantially similar to the first preferred embodiment responder unit 12 which was shown in FIG. 2a. The general functions and the read functions for the second preferred embodiment responder unit 12a is preferably the same as that described above for first preferred embodiment responder unit 12. The write function will differ slightly from that described hereinabove with respect to the first preferred embodiment responder unit 12.

The write function with regard to second preferred embodiment responder unit 12a is illustrated in FIG. 2b. The details of a write operation will be later described in greater detail with regards to FIG. 5. The components unique to the second preferred embodiment responder unit 12a will now be described. As with the first preferred embodiment responder unit 12, an end of burst detector 142 is connected to the RF bus 138 and has the function of monitoring the power level of a RF carrier at the RF bus 138. Such a RF carrier occurs at the RF bus 138 whenever the parallel resonant circuit 130 receives a RF interrogation pulse from the interrogation unit 10. The end of burst detector 142 emits at its output a RF threshold signal of predetermined value as soon as the power level of the RF carrier at the RF bus 138 drops below a predetermined threshold value.

Second preferred embodiment responder unit 12a differs in that it determines whether a received data bit is a "zero" or a "one" bit by the duration of the time period for which the RF carrier is deactivated (i.e. Pulse Width Modulation, PWM). For example, if the duration for which the carrier is deactivated is less than six clock cycles, the data could be defined as "zero" or "low". If the duration for which the carrier is deactivated is greater than six clock cycles, the data could be defined as "one" or "high". Obviously the bit definitions could be reversed. A start bit circuit 154 which would generate a start bit as in the first preferred embodiment could be used, however, since every data bit comprises some kind of signal transition and the actual data status is dependent on the duration of the signal transition a Start Bit is no longer necessary.

The output 150 of RF threshold detection circuit 142 is used in this embodiment as an Input Clock signal for input shift register 228. Assuming the input shift register 228 uses the rising edge of the Input Clock and assuming that RF threshold detection circuit 142 provides a "high" signal during the time periods during which the carrier is deactivated, the output 110 of RF threshold detection circuit 142 is inverted by an inverter 216 before being received by the input shift register 228. This assures that the data received at the input shift register 228 is valid when it is latched by the Input Clock signal. The Input Data received at the data input 226 of the input shift register 228 is provided by a divide-by-six divider 162a which operates in a different function than the divider 162 provided in the first preferred embodiment. Divider 162a counts the clock transitions of a clock signal having 1/16 the resonant frequency as it is output from divider 160. Divider 162a receives at its enable/clear_ input the output 150 of RF threshold detector. Normally this input will be held low such that the divider remains in its cleared state. A "high" signal from end of burst detector 142 enables the divider 162a to begin counting clock transitions. For a "zero" signal the length of the pulse is defined to be less than six clock cycles such that the divider 162a never reaches its maximum count and hence never is asserted "high". As output 150 of end of burst detector 142 does transition regardless of the length of the pulse, EOB through inverter 216 acts to load a "zero" into input shift register 226. If however, the length of the pulse is defined to be greater than six cycles for a "one" signal, then the divider 162a does reach its maximum count and asserts its output "high". Thus upon transition of the Input Clock 227 to the input shift register 228 a "one" is loaded therein via the Input Data 226 signal. The end detection circuit 234 counts the number of input clocks to activate the programming logic 232 if a correct data frame is received and the command decoder 230 has detected a subsequent programming command. As before, the data is then transferred from input shift register 228 to memory 168 or another memory via parallel data bus 220. Preferably, the memory to which the data is transferred is an electrically-erasable programmable read only memory (EEPROM).

The alternative functions such as initiating test commands or programming the frequency of the tuned circuit could be easily accomplished in the same manner as was described for the first preferred embodiment. Various modifications and combinations of the illustrative embodiments, as well as other embodiments of the invention, will be apparent to persons skilled in the art upon reference to the description. It is therefore intended that the appended claims encompass any such modifications or embodiments.

Now that the makeup of the components of the transponder arrangement has been described, the processes taking place in the operating state of the arrangement will be explained. The operating state of the arrangement in normal interrogation mode is described in U.S. Pat. No. 5,053,774, filed Feb. 13, 1991, incorporated by reference herein. Described hereinafter is the operating state of the arrangement during interrogation and programming of a responder unit 12,12a.

Figure 3:
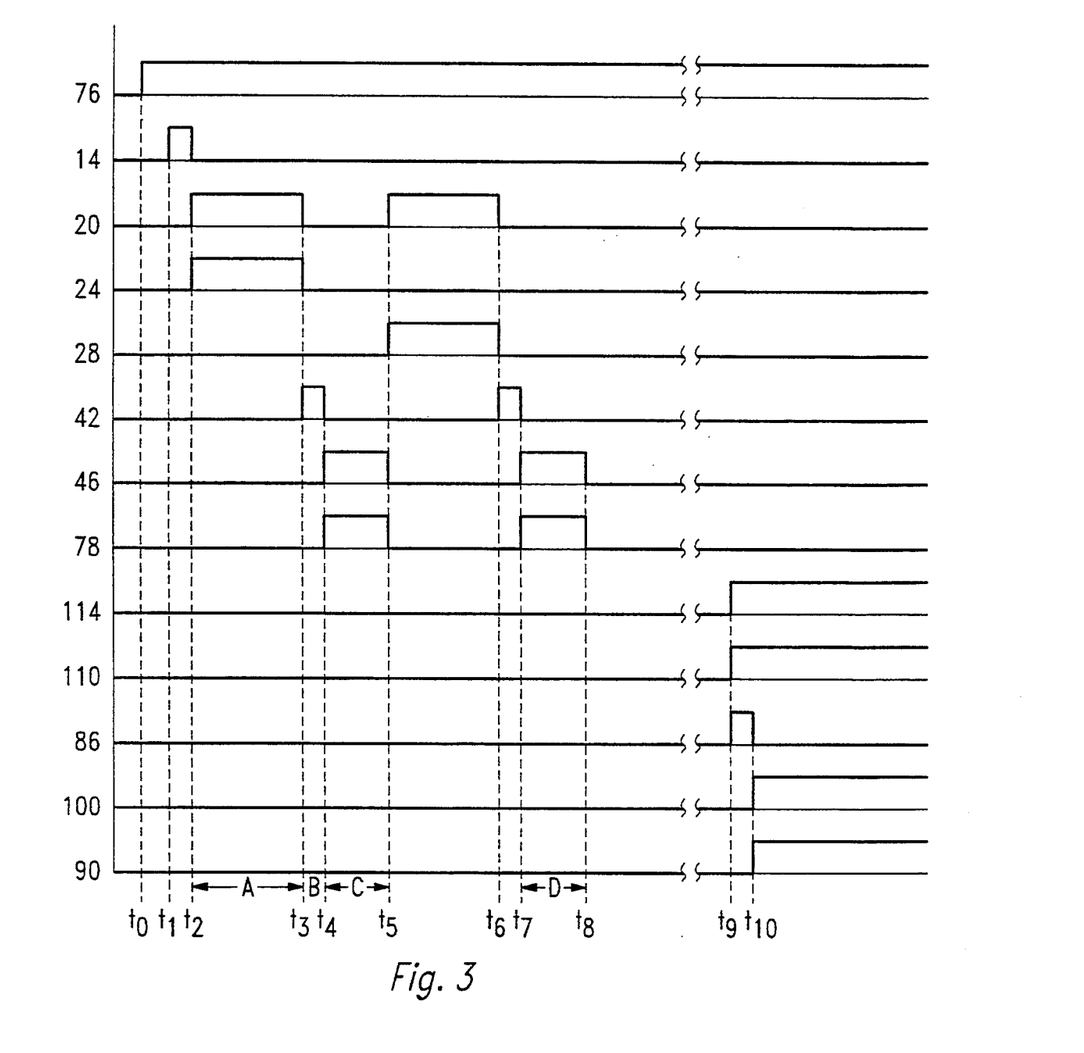
FIG. 3 is a timing diagram to explain the time relationships between the individual processes in the cooperation between the interrogation unit, the responder unit and the base unit during the reading of the contents of the responder unit memory.

It is assumed that responder units 12,12a as illustrated in FIGS. 2a–2b are associated with a relatively large number of objects and that the responder units 12,12a are to be individually addressed and interrogated using the interrogation unit 10. Reference is made here to FIG. 3 in which it is indicated which assemblies are active during which time periods and play a part within an operating cycle. The numbers given on the left are the reference numerals of the particular assemblies concerned whilst the active time periods are shown respectively along the horizontal lines.

For performing an interrogation operation the operator removes the interrogator unit 10 from the base unit 16 and at an instant $t_0$ closes the switch 76. As a result, the battery 74 is applied as supply voltage to selected assemblies within the unit. To initiate an interrogation operation the operator briefly depresses the key 14 (instant $t_1$) so that the input 15 of the microprocessor 18 is applied to ground for the duration of the depression of the key 14. This causes the microprocessor 18 by means of a signal at the output 22 to set the RF oscillator 20 in operation (instant $t_2$). At the same time, by means of a signal at the output 34, the microprocessor 18 closes the switch 24 so that during the time period A, the carrier wave generated by the RF generator 20 can pass via the switch 24 after amplification in the amplifier 26 to the coupling coil 32. By this carrier wave, the resonant circuit comprising the coil 38 and the capacitor 40 is stimulated to oscillate. The switches 42 and 46 are closed in this phase of the operating cycle. The coil 38 acts as transmitting coil which transmits the RF carrier wave as RF interrogation pulse for a duration defined by the duration of the signal at the output 22 of the microprocessor 18. After expiry of this duration defined by the microprocessor 18, operation of the RF generator 20 ends (instant $t_3$). To ensure that the oscillation in the resonant circuit formed by the coil 38 and the capacitor 40 dies away a periodically as quickly as possible, the switch 42 is briefly opened by a signal from the output 48 of the microprocessor 18 (period B) so that the resistor 44 acts as damping resistance for the resonant circuit. After again closing the switch 42, the switch 46 is opened (instant $t_4$, initiation of period C) and as a result the resonant circuit comprising the coil 38 and the capacitor 40 is switched over to a series resonant circuit and is ready to receive a reply from the responder unit 12,12a. Simultaneously with the opening of the switch 46 the switch 78 is closed and applies the supply voltage from the battery 74 to the clock generator 58, the demodulator 62 and the two amplifiers 52 and 54. For the duration of period C the interrogation unit 10 is now ready to receive signals back from the responder unit 12,12a.

It will be assumed that within the range of the coil 38 transmitting the RF interrogation pulse a responder unit 12,12a is present. The coil 132 of the parallel resonant circuit 130 of the responder unit 12,12a then receives this RF interrogation pulse so that the resonant circuit 130 is stimulated to oscillate. By means of the rectifier diode 144 the RF oscillation at the portion 138a of the RF bus 138 is rectified and the capacitor 136 is charged with direct current. For the energy supply of the assemblies of the responder unit 12,12a thereafter, only the energy stored in the capacitor 136 is used.

With the termination of the reception of the RF interrogation pulse (instant $t_3$), the RF level at the RF bus 138 begins to drop. The end of burst detector 142 detects this decrease and at its output 150 emits a EOB signal of predetermined value as soon as the power level drops below a predetermined level. The start detect circuit 154 upon receiving a POR signal will then monitor the output 150 of end of burst detection circuit 142. Upon receipt of an affirmatively stated EOB subsequent to the affirmatively stated POR signal, start detect circuit 154 switches power to the clock regenerator circuit 140 via switch 156. Output of start detect circuit 154 will remain positively asserted until a subsequent POR is received. Furthermore, with the start signal the pluck circuit 192 is triggered and thereupon emits for the duration of its hold time an excitation pulse which renders the field-effect transistor 190 conductive. As a result, a connection to ground is formed from the capacitor 136 via the coil 132 and the RF bus 138. As a reaction thereto, for the duration of the excitation pulse, a direct current flows through the coil 132 and stimulates the parallel resonant circuit 130 to oscillate with its resonant frequency. The parallel resonant circuit 130 thus becomes a RF carrier wave generator.

After termination of the excitation pulse at the output of the pluck circuit 192 the field-effect transistor 190 is again rendered nonconductive so that no more current can flow through the coil 132. Since however the parallel resonant circuit 130 has a high quality, the RF carrier oscillation does not cease immediately but the resonant circuit continues to oscillate with a damped oscillation. The divider 158, dividing the frequency of the RF carrier wave by two, emits after the second oscillation period a signal to the monoflop 192 which is thereby triggered. The monoflop 192, for the duration of its hold time, applies a maintenance pulse to the field-effect transistor 190. By the maintenance pulse from the pluck circuit 192, for the duration of the hold time, a current flow is caused through the coil 132 and this means that for a short time energy is "pumped" into the RF carrier wave generator. This pumping effect occurs after every eighth oscillation period of the RF carrier wave, due to the use of the divider 158.

It will be assumed that data are fixedly stored in the memory 168 and said data are uniquely assigned to the responder unit 12,12a. Said data may for example consist of 128 bits. With the timing of the clock signals applied to the clock input 176 the information present in the memory 168 is transferred to the output shift register 172. For this transfer operation, 128 pulses are required because then all the 128 data bits of the information are contained in the shift register 172. By also counting the clock pulses, the divider 184 determines when the transfer of the data is completed. After receiving 128 pulses, the divider 184 emits at its output 188 a signal to the FET 216 through diode 210. The division factor of third divider 184 is 128 in this instance due to the preferred data transmission bit length of 128. If this bit length were to change, then the division factor of third divider 184 would preferably change correspondingly. A diode 210 maintains unidirectional current flow from the divider 184 into a parallel RC combination of a capacitor 212 and a resistor 214 which maintain charge on the gate of a field-effect transistor or FET 216 for a known duration. With the diode 210 the capacitor 212 may be charged by divider 184, but must be discharged through resistor 214. The FET 216 serves to provide, when the gate of FET 216 maintained above a threshold voltage by the parallel combination of resistor 214 and capacitor 216, a low impedance discharge path for storage capacitor 136 to ground. In this manner, after transmission of a complete data frame in this case of 128 bits (read phase) from the transponder 12 to the interrogator unit 10, the remaining energy in the transponder 12 is eliminated by a short circuit across the charge capacitor 136. This action secures that the transponder is correctly initiated during the next charge phase and does not rest in a undefined or incorrect state such that a subsequent charge-up could be blocked. Additionally by this function, each transponder 12 within the field of the interrogator 10 has an identical start condition. For the read phase the 128 factor of fourth divider 184 allows transponder 12 to transmit 128 bits. For the write phase, however, a greater number of clock cycles is typically required for transfer of each bit—hence a lesser number of bits will be transferred in the time of the 128 cycles as received from divider 160. The actual number of bits transferred in that time period will be dependent on the modulation scheme that is chosen.

By supplying clock pulses to the shift register 172 at its shift clock input 176, the information contained therein is emitted at the output 173 and supplied to the field-effect transistor 200. Depending on the binary value of the signal at the output 173 of the shift register 172, the field-effect transistor 260 is rendered conductive or nonconductive. In the conductive state of the field-effect transistor 200 the capacitor 198 is connected parallel to the parallel resonant circuit 130 so that the oscillation frequency thereof is governed by the sum of the capacitance values of the capacitor 134 and the capacitor 198. If, however, the field-effect transistor 200 is nonconductive, the frequency with which the parallel resonant circuit 130 oscillates is governed solely by the capacitance of the capacitor 134. The switching on and off of the field-effect transistor 200, controlled in dependence upon the data from the shift register 172, thus effects a frequency shift keying of the oscillation frequency of the parallel resonant circuit 130, which leads to the well-known FSK modulation of the RF carrier wave generated.

In a practically executed example, the RF oscillator was operated with a frequency of 125 Khz so that accordingly the parallel resonant circuit 130 was also tuned to this frequency. When using this frequency, it was possible to achieve that 64 bits of the information stored in the memory 168 were sent back to the interrogation unit 10 within 5 ms. By means of a single RF interrogation pulse, it was possible to effect return of the information fifteen times before the available energy in the responder unit 12,12a became too small for satisfactory operation.

The condition will now be considered where the responder unit 12,12a, via the parallel resonant circuit 130, returns to the interrogation unit 10 information consisting of 128 bits. As already mentioned above, the interrogation unit 10, after termination of the transmission of the RF interrogation pulse, was set to the receiving state by opening the switch 46 and closing the switch 78. The modulated RF carrier signal received by the coil 38 is amplified, in this state of the circuit, in the amplifiers 52 and 54 and supplied to the clock generator 58 and the demodulator 62. The clock generator 58 generates, from the RF signal received, a clock signal for the microprocessor 18. The demodulator 62 demodulates the RF carrier signal subjected to the FSK modulation in the responder unit 12,12a. The demodulated signal is supplied to the input 64 of the microprocessor 18 which thereupon supplies it, via the connection 68, to the random access memory 66. At the same time, the demodulated information can be visibly displayed to the operator in the display unit 72.

A possible case in practice is that within the time period in which the RF interrogation pulse is transmitted by the coil 38, no responder unit 12,12a is present within the range of the interrogation unit 10. In this case, the interrogation unit 10 does not receive, within a predetermined period after completion of the RF interrogation signal, an answer and this causes the microprocessor 18 to restore the operating state present on transmission of the first interrogation pulse. However, instead of closing the switch 24 by a signal at the output 36, the microprocessor 18 closes the switch 28 (instant $t_5$). As a result, the RF oscillation generated by the RF oscillator 20 is supplied to the coil 38 via the amplifier 30 which has a higher gain than the amplifier 26. As a result transmission of the RF interrogation pulse is effected with higher power so that a greater range results. This increases the probability of a responder unit 12,12a being present within the range which will then respond and send back a response signal (period D).

The repeated transmission of a RF interrogation pulse with higher power can be used not only when after sending the first pulse no responder unit 12,12a has replied. For it would also be possible to effect this repeated transmission when a responder unit 12,12a has already answered. This would make it possible for a responder unit 12,12a disposed closer to the interrogation unit 10 to reply to the first RF interrogation signal whilst as reaction to the RF interrogation signal transmitted with higher power a responder unit 12,12a lying at a greater distance could reply. If this possibility is to be utilized, however, it must be ensured in the responder units that after receiving a RF interrogation pulse and executing a return transmission cycle for a certain period, they are insensitive to the receipt of a further RF interrogation pulse. This makes it possible to prevent the same responder unit 12,12a replying to two consecutively transmitted RF interrogation pulses.

In practical use, numerous objects, each provided with a responder unit 12,12a, are addressed in succession by the interrogation unit 10 by transmission of a RF interrogation pulse. The information returned by the responder units 12,12a is received by the interrogation unit 10 and stored in the random access memory 66. In the construction described in each case, the responder units 12,12a which are within the transmitting range of the interrogation unit 10 are addressed. It may, however, also be desirable to address amongst a larger number of responder units 12,12a only quite specific individual units and cause them to return the information stored in them. This can be achieved by providing the processor 202 in the responder unit 12,12a. Firstly, it must be ensured in the interrogation unit 10 that with aid of the modulator 98 cooperating with the microprocessor 18, the RF interrogation pulse to be transmitted is modulated with the address which is provided for the responder unit 12,12a to be specifically activated. The processor preferably monitors the data received by input shift register 228 and placed upon data bus 220, then determines whether the address applied to it coincides with an address fixedly or temporarily set in the responder unit 12,12a. If the processor 202 detects such coincidence, it furnishes at its output 206 an address match start signal which in addition to the start detect circuit 154 in the use previously described, allows the sending back of data to the interrogation unit 10 by passing the start signal through a switch 164 on to clock regeneration circuit 140. In this manner, amongst a large number of objects provided with responder units 12,12a it is possible to specifically search for and find those with specific addresses.

After carrying out a relatively large number of interrogation cycles with the aid of the responder unit 12,12a, in practical use, information returned from a relatively large number of responder units 12,12a is stored in the random access memory 66. For evaluation, as a rule, this information must then be transferred to a central data processing unit. It will now be described how this is done.

In the simplest case the data are taken off from the random access memory 66 at the jack 70 which is indicated as representative of a multipole connection in FIG. 1. Via said jack 70 the information contained in the memory 66 may be read in a manner with which the artisan is familiar.

In the interrogation unit 10, illustrated in FIG. 1 the information from the random access memory 66 may, however, also be transmitted contactless to the base unit. The interrogation unit 10 is first placed on the base unit 16 so that the coil 96 comes to lie spatially close to the coil 118 in the base unit 16. As already mentioned above, on placing the responder unit 12,12a on the base unit 16 the switch 114 is also closed (instant t9) so that charging of the battery 74 is ensured. Utilizing the signal furnished by the charge sensor 86, the microprocessor 18 is informed that the interrogation unit 10 is on the base unit 16. When the operator now closes the switch 76 and briefly depresses the key 14, the microprocessor 18 initiates an information transfer cycle in the course of which the content of the random access memory is transferred to the base unit 16. From the base unit 16 via the output 214 this information may be transferred to a central data processing unit. For initiating the data transfer process, the microprocessor closes the switches 100 and 90 (instant $t_{10}$) and ensures that the oscillator 20 generates RF carrier oscillations. The information from the random access memory 66 is supplied, via the switch 100, to the modulator 98 which modulates the RF carrier wave which the RF oscillator 20 generates. Via the switch 90 and the amplifier 94, the modulated RF carrier wave reaches the coil 96 from which it is coupled to the coil 118. The demodulator 120 demodulates the RF carrier wave so that at the output 214, the information taken from the random access memory 66 is available for further transfer to the central data processing unit.

In FIG. 1, in dashed line, an alternative to transmitting the data from the memory 66 to a data processing unit is indicated. When using this alternative the modulator 98 in the interrogation unit 10 and the demodulator in the base unit 16 are not required because the information transfer is not in the form of modulation of a RF carrier wave but directly, i.e. using low-frequency signals employing the coils 104 and 118.

It has been shown that in the responder unit 12,12a, the energy contained in the received RF carrier wave is stored and utilized for supplying assemblies necessary for the transmitting back of the stored data. The clock signals necessary for the control and synchronization are derived from the RF carrier wave which is generated immediately after termination of the RF interrogation pulse in the responder unit 12,12a. Due to the derivation of the clock signal from the RF carrier wave signal a very good synchronization is achieved between the transmitter side and receiving side. The arrangement is not sensitive to frequency changes and calibration is therefore not necessary.

In yet another embodiment, in the responder unit 12,12a, a processor 202 may also be contained, the purpose of which will be explained below. Said processor 202 can receive input signals from a sensor 204 which responds to physical parameters in the environment of the responder unit 12,12a, for example to the ambient temperature, the ambient pressure or the like. The processor 202 can furnish data representing parameters determined by the sensor 204 to data bus 220. The processor 202 can receive at an input 208 signals from the output 210 of a demodulator 212. Alternatively, processor 202 might be controlled by command decoder 230 to receive data on data bus 220.

FIG. 4, taken in conjunction with FIG. 3, illustrates a timing diagram for the programming sequence or write cycle of the preferred embodiment of the present invention. The charge period or period A as described hereinabove remains the same for the write cycle, beginning at instant $t_2$ and ending at instant $t_3$. A new, programming period, is inserted between instant $t_3$ and a new instant $t_3'$. The data will be transferred from the interrogation unit 10 to the responder unit 12,12a using a modulation scheme known as pulse-pause modulation. This pulse-pause modulation will effectively be a form of amplitude modulation as it is passed on from the resonant circuit 130 of the responder unit 12,12a. This modulation is initiated by the interrogator unit 10, which charges the responder unit 12,12a, during time period A as before. Now, a Start Signal is transmitted by means of a signal at the output 34 the microprocessor 18 which opens the switch 24 momentarily so that a pause in the RF signal is effected. To ensure that the oscillation in the resonant circuit formed by the coil 38 and the capacitor 40 dies away a periodically as quickly as possible the switch 42 is briefly opened by a signal from the output 48 of the microprocessor 18 so that the resistor 44 acts as damping resistance for the resonant circuit. At the responder unit 12,12a during this time period the oscillations of RF oscillator circuit 130, without the benefit of continued RF signal receipt, begin to decay in amplitude. The end of burst circuit 142 will now sense this, and may represent this time period of reduced amplitude with a positively asserted digital signal (typically, five volts) 5 at its output 150. Alternatively, a separate demodulator circuit might be used in parallel with the end of burst circuit 142 to demodulate the RF carrier using an alternative method to pulse-pause modulation. As shown in FIG. 4, the presence of a negatively asserted voltage pulse at the beginning of a data bit window (indicated by the dotted lines) could indicate a logical zero (L), while the absence of a negatively asserted voltage pulse at the beginning of a data bit window could indicate a logical one (H), or vice versa. The pulses effected for transmission of data or commands will be produced in the same manner by interrogator unit 10 as that of the Start Signal. Many schemes exist for command decoder 230 to interpret the sequence of bits received from input shift register 228 via data bus 220 as commands or data. By way of example, the first three bits following the Start Signal, could be a Command. The next three bits following the Command could be Data associated with the preceding Command. As indicated in FIG. 4, a time period should be left before expiry of this programming period, at instant t₃', to allow for execution of the programming of the memory 168 as previously described. Obviously, this elementary scenario is exemplary and many other schemes could be used to interpret the output of input shift register 228.

Figure 5:
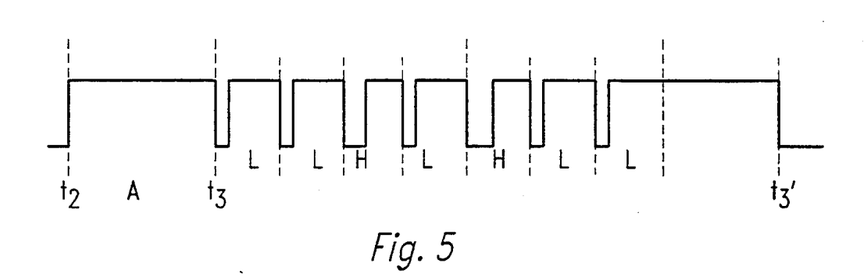
FIG. 5 is a timing diagram to explain another modulation scheme used for programming the responder unit memory in relation to the overall timing scheme as shown in FIG. 3.

FIG. 5, taken in conjunction with FIG. 3 illustrates a timing diagram for the programming or write cycle of another preferred embodiment of the present invention. The operation of this embodiment is essentially identical to the embodiment illustrated in FIG. 4 with the presence of a negatively asserted voltage pulse of a first selected length at the beginning of a data bit window (indicated by the dotted lines) could indicate a logical zero (L), while the presence of a negatively asserted voltage pulse of a second selected length at the beginning of a data bit window could indicate a logical one (H). Many other modulation schemes will be obvious to one of ordinary skill in the art of communications systems design. No start bit is necessary in this embodiment because a potential does not exist for the first data period to have a data bit which causes no transition in the Input Data signal as with the method discussed in FIG. 4.

Many useful embodiments of systems advantageously incorporating the developments of the present invention may be imagined. But a few embodiments are described hereinbelow. For example, in this manner the ambient temperature or the ambient pressure at the location at which the responder unit 12,12a is disposed can be requested. To make this possible, at the responder unit 12,12a, a sensor 204 may be disposed which is sensitive to the particular parameters of interest. The sensor 204 then passes its output signal to a processor 202, which from the sensor output signal, generates data values which it supplies via the data bus 220 to the memory 168, which in this example of embodiment is a random access memory. The data which have been so entered into said random access memory are then utilized in the manner described above, via the shift register 172, for controlling the field-effect transistor 200 for modulation of the RF carrier wave to be sent back. Alternatively, the data may be entered directly into shift register 172 by processor 202, bypassing memory 168 altogether.

Another scenario for which a programmable transponder arrangement may be useful include providing a contactless means for testing assembled responder units 12,12a. In this instance test data may be transmitted to the responder units 12,12a as previously described. Data may be placed on data bus 220 in the same manner as previously described, under control of command decoder 230. Command decoder 230 may then initiate a test sequence, and place the results on the data bus 220. Again, from data bus 220 the test results may be transmitted using shift register 172.

In yet another scenario, a contactless means for tuning assembled responder units 12,12a is provided. Data may be placed on data bus 220 in the same manner as previously described, under control of command decoder 230. Further, command decoder 230 may then latch data into tuning latch 244, shunting selected capacitors 240 across the resonant circuit 130 through FETs 242. By added these selected capacitors to the resonant circuit 130, the tuned frequency of the responder is lowered by a selected amount.

In still yet another scenario, the addressing scheme as described above, in which the interrogation unit 10 is operating in cooperation with a number of responder units 12,12a within the transmitting range of the interrogation unit 10, can be supplemented by allowing the responder units 12,12a to have their addresses programmed after assembly in a contactless manner. As such, the desired address could be placed in memory 168 and compared by processor 202 to the incoming address from the interrogation unit 10.

Figure 6:
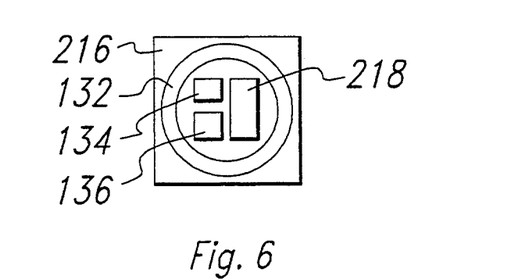
FIG. 6 is a first possible embodiment of the responder units.

The responder unit 12,12a described can be made almost completely as an integrated circuit so that it can be produced with very small dimensions. Only the coil 132, the capacitor 134 and the capacitor 136 need be provided as individual components outside the integrated circuit. FIG. 6 shows how the individual components can be arranged on a support plate. The integrated circuit 218 and the capacitors 134, 136 are surrounded by the coil 132 which is made annular. A responder unit 12,12a with this construction could, for example, be disposed in each individual spare part of a large store of spare parts from which individual spares are automatically picked when required. Using an interrogation unit 10 the spares could be specifically sought in the store and then automatically removed.

Figure 7:
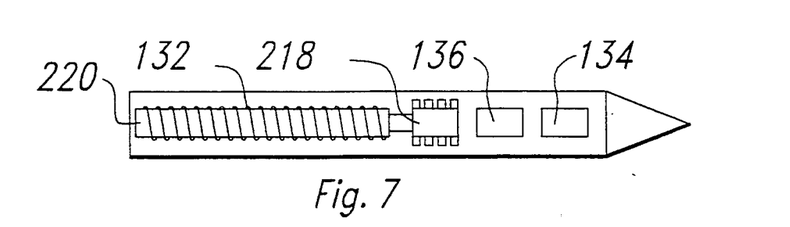
FIG. 7 is a second possible embodiment of the responder unit.

As already mentioned at the beginning the responder 12,12a can for example also be attached to animals in a large herd and employing the interrogation unit 10 the animals can be continuously supervised and checked. Since the components of the responder unit 12,12a can be made very small it is even possible to make the entire unit in the form of a small pin which can be implanted under the skin of the animal. A corresponding construction is shown in FIG. 7. The coil in this example could be wound round a small ferrite core 220 which increases the sensitivity.

The data is modulated onto the responder unit carrier wave by use of a FET 200 which can connect a capacitance in parallel with the resonant circuit 130. Many other modulators 200 can be envisioned which could modulate carrier waves generated using any of a number of possible carrier wave generators.

A few preferred embodiments have been described in detail hereinabove. It is to be understood that the scope of the invention also comprehends embodiments different from those described, yet within the scope of the claims.

For example, display devices can be cathode ray tubes or other raster-scanned devices, liquid crystal displays, or plasma displays. "Microcomputer" in some contexts is used to mean that microcomputer requires a memory and "microprocessor" does not. The usage herein is that these terms can also be synonymous and refer to equivalent things. The phrase "processing circuitry" or "control circuitry" comprehends ASICs (application specific integrated circuits), PAL (programmable array logic), PLAs (programmable logic arrays), decoders, memories, non-software based processors, or other circuitry, or digital computers including microprocessors and microcomputers of any architecture, or combinations thereof. Memory devices include SRAM (static random access memory), DRAM (dynamic random access memory), pseudo-static RAM, latches, EEPROM (electrically-erasable programmable read-only memory), EPROM (erasable programmable read-only memory), registers, or any other memory device known in the art. Words of inclusion are to be interpreted as nonexhaustive in considering the scope of the invention.

Implementation is contemplated in discrete components or fully integrated circuits in silicon, gallium arsenide, or other electronic materials families, as well as in optical-based or other technology-based forms and embodiments. It should be understood that various embodiments of the invention can employ or be embodied in hardware, software or microcoded firmware.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. Transponder arrangement comprising:
   a) an interrogator unit which transmits at least one RF programming sequence followed by at least one RF interrogation pulse comprising
      i) a transmitter for transmission of said at least one RF programming sequence comprising write data that is modulated upon a carrier by pulse-pause modulation and said at least one RF interrogation pulse, and
      ii) a receiver for receiving read data at the termination of the interrogation signal; and
   b) a responder unit located in spaced relation with respect to said interrogator unit for receiving said RF transmissions and returning read data to said interrogator unit in response to the reception of said at least one interrogation pulse, said responder unit comprising
      i) a responder unit receiver for receiving said at least one RF programming sequence and said at least one RF interrogation pulse,
      ii) a responder unit demodulator for demodulating said write data from said carrier of said RF programming sequence,
      iii) a first memory suitable for having memory data therein modified by said write data,
      iv) a second memory containing read data therein,
      v) a RF threshold detector for detecting termination of said RF transmissions,
      vi) a responder unit RF carrier wave generator under control of said RF threshold detector to activate upon said detection of said termination, and
      vii) a responder unit modulator to modulate the RF carrier with said read data from said second memory means.

2. The arrangement according to claim 1 wherein said RF carrier wave generator comprises a parallel resonant circuit.

3. The arrangement according to claim 2 wherein said parallel resonant circuit also serves for receiving said RF interrogation pulse.

4. The arrangement according to claim 2 wherein said responder unit modulator comprises a switch to connect a capacitor across said parallel resonant circuit.

5. The arrangement according to claim 1 wherein said responder unit further comprises a pluck circuit which provides a pluck signal which for its duration causes the oscillation of said responder unit carrier wave generator to be maintained.

6. The arrangement according to claim 1 wherein said first memory and said second memory are a single memory.

7. The arrangement according to claim 1 wherein said single memory is an EEPROM.

8. The arrangement according to claim 1 wherein at least a part of said read data is derived from said write data.

9. The arrangement according to claim 1 wherein said responder unit further comprises an energy accumulator which stores energy contained in received RF transmissions.

10. The arrangement according to claim 1 wherein said responder unit further comprises a clock regenerator circuit.

11. The arrangement according to claim 10 wherein said clock regenerator circuit is enabled by a start signal from a Start Detection circuit.

12. The arrangement according to claim 11 wherein said clock regenerator circuit is further enabled by an address match start signal from a processor.

13. A method of communicating between an interrogator unit and a responder unit, said method comprising the steps of:
   a) storing energy in a responder unit energy accumulator in a contactless fashion by RF energy transmitted from said interrogator unit to said responder unit;
   b) transmitting at least one RF programming sequence from said interrogator unit to said responder unit;
   c) receiving at said responder unit said first set of data transmitted by said RF programming sequence from said interrogator unit;

d) transmitting at least one RF interrogation pulse from said interrogator unit to said responder unit;

e) activating in said responder unit a RF threshold signal upon detection of a decreasing power level of said RF interrogation pulse;

f) exciting, in said responder unit, upon activation of said RF threshold signal, a RF carrier wave having a frequency of said RF interrogation pulse;

g) modulating in said responder unit said RF carrier wave with a second set of data;

h) transmitting said modulated RF carrier wave from said responder unit to said interrogator unit; and i) initiating further actions in said responder unit wherein said further actions depend upon said first set of data received from said interrogator unit.

14. An interrogator unit for communication with at least one programmable responder unit in spaced relation with respect to said interrogator unit, the interrogator unit comprising:

i) a control circuit;

ii) an interrogator unit carrier wave generator;

iii) an interrogator unit modulator for pulse-pause modulation of write data upon said interrogator unit carrier wave;

iv) a transmitter which receives the output of said interrogator unit modulator and transmits at least one RF programming sequence having said write data pulse-pause modulated thereon for programming said responder unit and at least one RF interrogation pulse for interrogating said responder unit to return read data stored therein in the form of a RF response;

v) a receiver for receiving said RF response upon termination of said RF interrogation pulse; and vi) an interrogator unit demodulator for demodulation of said read data from said RF response.

15. A responder unit located in spaced relation with respect to an interrogator unit, said responder unit comprising:

i) a responder unit receiver for receiving from said interrogator unit RF transmissions of at least one RF programming sequence and at least one RF interrogation pulse;

ii) a responder unit demodulator for demodulating pulse-pause modulated write data transmitted by said RF programming sequence from said interrogator unit;

iii) a first memory suitable for having memory data therein modified by said write data;

iv) a second memory containing read data therein;

v) a RF threshold detector for detecting termination of said RF transmissions;

vi) a responder unit RF carrier wave generator under control of said RF threshold detector to activate upon said detection of said termination; and vii) a responder unit modulator to modulate the RF carrier with said read data from said second memory means.

16. The method of claim 13 wherein said further actions comprise initiating a test sequence upon receipt of said first set of data.

17. The method of claim 13 wherein said further actions comprise modifying properties of said responder unit in response to said first set of data.

18. The method of claim 17 wherein said properties of said responder unit comprise a responder unit RF carrier wave generator tuned frequency.

19. The method of claim 13 wherein said further actions comprise modifying an internally-stored address within said responder unit in response to said first set of data.

20. The method of claim 13 wherein said modulation is pulse-pause modulation.

21. The method of claim 20 wherein said pulse-pause modulation is accomplished in response to a gating signal which activates or deactivates said RF carrier wave within a time period known as a data bit window.

* * * * *